US012705415B2

(12) United States Patent
Shi et al.

(10) Patent No.: US 12,705,415 B2
(45) Date of Patent: Aug. 11, 2026

(54) PAGE INTERACTION METHOD, DEVICE, APPARATUS AND STORAGE MEDIUM

(71) Applicant: Beijing Zitiao Network Technology Co., Ltd., Beijing (CN)

(72) Inventors: Linxuan Shi, Beijing (CN); Zhe He, Beijing (CN); Yaodong Zheng, Beijing (CN); Bingyang Xie, Beijing (CN); Shaoqiang Huang, Beijing (CN); Maoqi Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 195 days.

(21) Appl. No.: 18/431,650

(22) Filed: Feb. 2, 2024

(65) Prior Publication Data

US 2024/0265194 A1 Aug. 8, 2024

(30) Foreign Application Priority Data

Feb. 2, 2023 (CN) ......................... 202310118565.9

(51) Int. Cl.
*G06F 40/137* (2020.01)
*G06F 3/04847* (2022.01)

(52) U.S. Cl.
CPC ........ *G06F 40/137* (2020.01); *G06F 3/04847* (2013.01)

(58) Field of Classification Search
CPC ........................... G06F 3/04847; G06F 40/137
See application file for complete search history.

(56) References Cited

U.S. PATENT DOCUMENTS

2009/0013256 A1* 1/2009 Friedman ................ H04L 12/42 709/222
2012/0023409 A1* 1/2012 Gvirtsman .............. H04L 41/22 715/735

(Continued)

FOREIGN PATENT DOCUMENTS

CN 103530379 A 1/2014
CN 104243193 A 12/2014

(Continued)

OTHER PUBLICATIONS

First Office Action for Chinese Application No. 202310118565.9, mailed on Oct. 26, 2024, 16 pages.

(Continued)

*Primary Examiner* — Seth A Silverman
(74) *Attorney, Agent, or Firm* — Astute IP Law Group

(57) ABSTRACT

The embodiment of the disclosure provides a page interaction method, device, apparatus and a storage medium. When detecting that a user switches a view mode to a topological mode, a topological graph of service objects corresponding to a current service object is acquired; wherein the topological graph of service objects comprises service objects at a plurality of hierarchical levels; a topological subgraph of service objects taking the current service object as highest hierarchical level is extracted from the topological graph of service objects; instance data corresponding to one or more service objects in the topological subgraph of service objects are acquired; and the instance data are displayed on a current interface according to a hierarchical relationship of the topological subgraph of service objects.

20 Claims, 9 Drawing Sheets

(56) References Cited

U.S. PATENT DOCUMENTS

| | | | | |
|---|---|---|---|---|
| 2015/0073858 | A1 | 3/2015 | Philip et al. | |
| 2017/0169174 | A1* | 6/2017 | Yeung .................... | G16H 50/70 |
| 2020/0336387 | A1* | 10/2020 | Suzuki .................. | H04L 41/147 |

FOREIGN PATENT DOCUMENTS

| | | | |
|---|---|---|---|
| CN | 112464039 | A | 3/2021 |
| CN | 112579558 | A | 3/2021 |
| CN | 113822963 | A | 12/2021 |
| CN | 114003157 | A | 2/2022 |
| CN | 114116065 | A | 3/2022 |
| CN | 114244595 | A | 3/2022 |
| CN | 115473823 | A | 12/2022 |
| CN | 116088721 | A | 5/2023 |
| WO | 2022116920 | A1 | 6/2022 |

OTHER PUBLICATIONS

International Search Report for PCT Patent Application No. PCT/CN2024/075266, mailed Apr. 29, 2024, 7 pages.

* cited by examiner

View configuration page

View name

View mode Table mode Topology mode Gantt chart mode

| Resource panel | Configuration panel |
| --- | --- |
| A | |
| Attribute a1 | |
| Attribute a2 | |
| Attribute a3 | |
| B | |
| Attribute b1 | |
| Attribute b2 | |
| C | |
| D | |
| E | |

Fig. 4

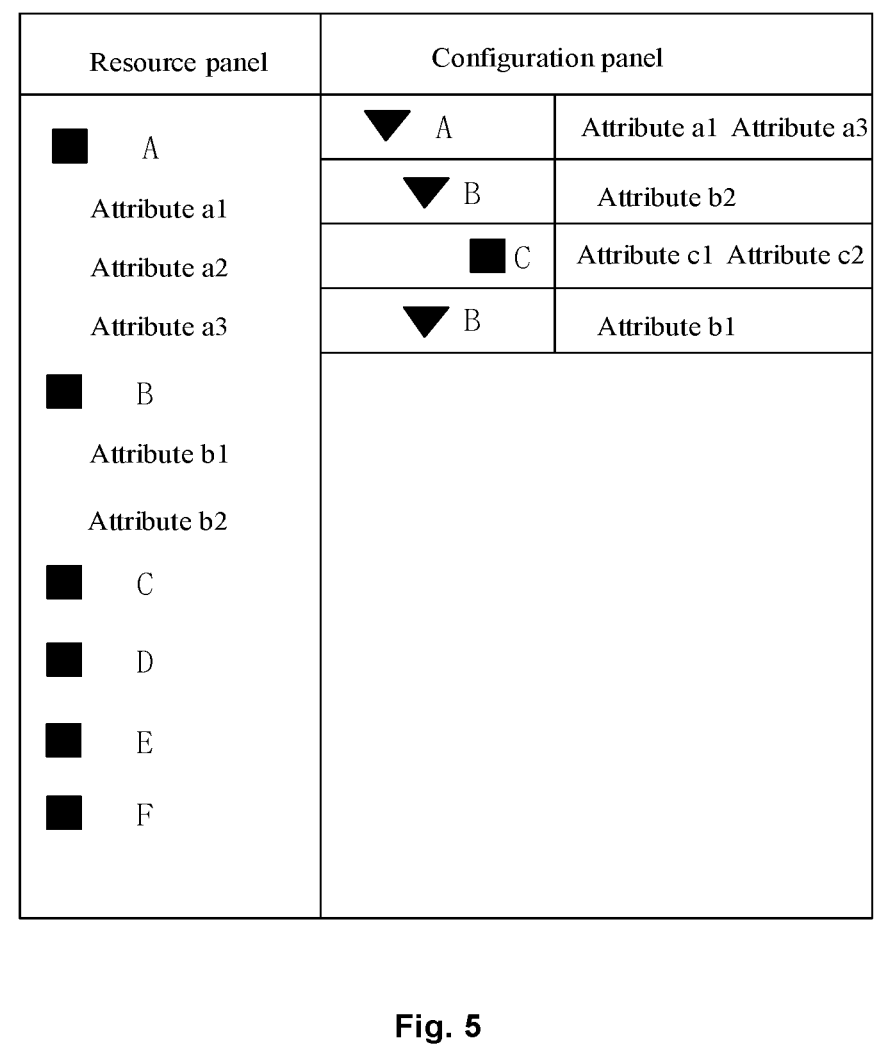

Resource panel

A
Attribute a1
Attribute a2
Attribute a3
B
Attribute b1
Attribute b2
C
D
E
F

Configuration panel

| | |
|---|---|
| A | Attribute a1 Attribute a3 |
| B | Attribute b2 |
| C | Attribute c1 Attribute c2 |
| B | Attribute b1 |

Fig. 5

Incidence relationship:

Service object: A

Service object: B

Filter panel

Demand

Plan

Defect

Filter criterion

PAGE INTERACTION METHOD, DEVICE, APPARATUS AND STORAGE MEDIUM

CROSS REFERENCE TO RELATED APPLICATION

This application claims priority from Chinese patent application Ser. No. 20/231,0118565.9, filed on Feb. 2, 2023, the contents of which are hereby incorporated by reference in their entirety for all purposes.

TECHNICAL FIELD

The present disclosure relates to the field of interaction technologies, and in particular, to a page interaction method, device, apparatus, and storage medium.

BACKGROUND

In the process of developing and managing a service project (e.g., a software project), a large amount of service data is usually generated. With the continuous increasement of the complexity of the service project, the management of the service data is very important. If the service data are managed in an efficient manner, the efficiency of the development and management of the service project can be greatly improved.

At present, the tree view is widely used for managing service data.

SUMMARY

According to an aspect of the present disclosure, the embodiment of the present disclosure provides a page interaction method comprising:

when detecting that a user switches a view mode to a topological mode, acquiring a topological graph of service objects corresponding to a current service object; wherein the topological graph of service objects comprises service objects at a plurality of hierarchical levels;

extracting, from the topological graph of service objects, a topological subgraph of service objects taking the current service object as highest hierarchical level;

acquiring instance data corresponding to one or more service objects in the topological subgraph of service objects; and displaying the instance data on a current interface according to a hierarchical relationship of the topological subgraph of service objects.

According to another aspect of the present disclosure, the embodiment of the present disclosure provides a page interaction device comprising:

an acquisition module for topological graph of service objects configure to when detecting that a user switches a view mode to a topological mode, acquire a topological graph of service objects corresponding to a current service object; wherein the topological graph of service objects comprises service objects at a plurality of hierarchical levels;

an acquisition module for topological subgraph of service objects, configured to extract, from the topological graph of service objects, a topological subgraph of service objects taking the current service object as highest hierarchical level;

an acquisition module for instance data, configured to acquire instance data corresponding to one or more service objects in the topological subgraph of service objects;

a data display module, configured to display the instance data on a current interface according to a hierarchical relationship of the topological subgraph of service objects.

According to another aspect of the present disclosure, the embodiment of the present disclosure provides an electronic apparatus, and the electronic apparatus comprises:

one or more processors;

a storage device to store one or more programs, and the one or more programs, when executed by the one or more processors, cause the one or more processors to perform the page interaction method of the embodiment of the present disclosure.

According to another aspect of the present disclosure, the embodiment of the present disclosure provides a storage medium containing computer-executable instructions, wherein computer-executable instructions, when executed by a computer processor, cause the computer processor to perform the page interaction method of the embodiment of the present disclosure.

BRIEF DESCRIPTION OF THE DRAWINGS

The above and other features, advantages, and aspects of embodiments of the present disclosure will become more apparent by referring to the following detailed description when taken in conjunction with the accompanying drawings. Throughout the drawings, the same or similar reference numbers refer to the same or similar elements. It should be understood that the drawings are schematic and that elements and components are not necessarily drawn to scale.

FIG. 4 is a schematic diagram of a configuration page provided by an embodiment of the present disclosure;

FIG. 5 is an exemplary diagram of a configuration page provided by an embodiment of the present disclosure;

DETAILED DESCRIPTION

Figure 1:
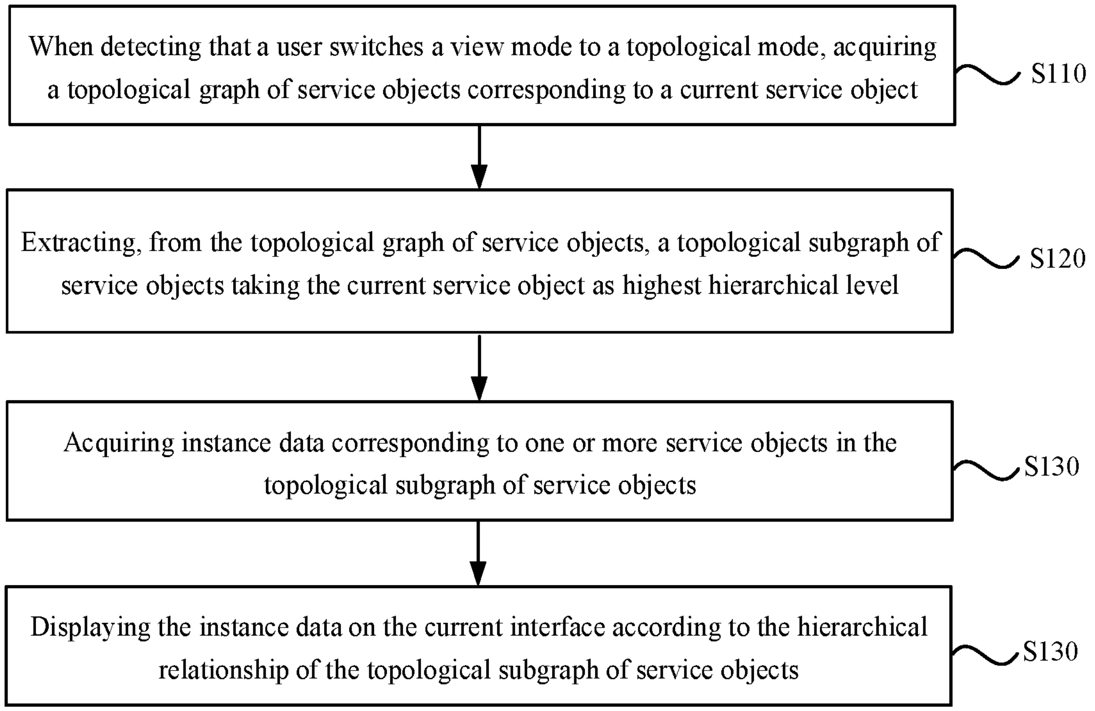
FIG. 1 is a schematic flowchart of a page interaction method provided by an embodiment of the present disclosure.

Embodiments of the present disclosure will be described in more detail below with reference to the accompanying drawings. While certain embodiments of the present disclosure are shown in the drawings, it should be understood that the present disclosure can be embodied in various forms and should not be construed as limited to the embodiments set forth herein, but rather are provided for a more complete and thorough understanding of the present disclosure. It should be understood that the drawings and the embodiments of the disclosure are for illustration purposes only and are not intended to limit the scope of the disclosure.

It should be understood that the various steps recited in method embodiments of the present disclosure can be performed in a different order, and/or performed in parallel. Moreover, method embodiments can include additional steps and/or omit performing the illustrated steps. The scope of the present disclosure is not limited in this respect.

The term "including" and variations thereof as used herein is intended to be open-ended, i.e., "including but not limited to". The term "based on" is "based at least in part on". The term "one embodiment" means "at least one embodiment"; the term "another embodiment" means "at least one additional embodiment"; and the term "some embodiments" means "at least some embodiments". Relevant definitions for other terms will be given in the following description.

It should be noted that the terms "first", "second", and the like in the present disclosure are only used for distinguishing different devices, modules or units, and are not used for limiting the order or interdependence of the functions performed by the devices, modules or units.

It is noted that references to "a", "an", and "a plurality of" in this disclosure are intended to be illustrative rather than limiting, and that those skilled in the art will appreciate that references to "one or more" are intended to be exemplary and not limiting unless the context clearly indicates otherwise.

The names of messages or information exchanged between devices in the embodiments of the present disclosure are for illustrative purposes only, and are not intended to limit the scope of the messages or information.

It is understood that, before the technical solutions disclosed in the embodiments of the present disclosure are used, the user should be informed of the type, the use range, the use scene, and so forth of the personal information related to the present disclosure in a proper manner according to the relevant laws and regulations and obtain the authorization of the user.

For example, in response to receiving a user's active request, prompt information is sent to the user to explicitly prompt the user that the requested operation to be performed would require acquisition and use of personal information of the user. Thus, the user can autonomously select whether to provide personal information to software or hardware such as an electronic apparatus, an application program, a server, or a storage medium that performs the operations of the technical solution of the present disclosure, according to the prompt information.

As an alternative but non-limiting implementation, in response to receiving an active request from the user, the manner of sending the prompt information to the user can be, for example, a pop-up window, and the prompt information can be presented in a text manner in the pop-up window. In addition, a selection control for providing personal information to the electronic apparatus by the user's selection of "agree" or "disagree" can be carried in the pop-up window.

It is understood that the above notification and user authorization process is only illustrative and is not intended to limit the implementation of the present disclosure, and other ways of satisfying the relevant laws and regulations can be applied to the implementation of the present disclosure.

It will be appreciated that the data referred to in this disclosure, including but not limited to the data itself and the acquisition or use of the data, should comply with the requirements of the applicable laws and regulations and related regulations.

FIG. 1 is a schematic flowchart of a page interaction method provided by an embodiment of the present disclosure, and the embodiment of the present disclosure is applicable to a situation where data are managed in an interactive manner. The method may be executed by a page interaction device, and the device may be implemented in a form of software and/or hardware, and optionally implemented by an electronic apparatus. The electronic apparatus may be a mobile terminal, a PC terminal, or a server.

As shown in FIG. 1, the method includes:

S110, when detecting that a user switches a view mode to a topological mode, acquiring a topological graph of service objects corresponding to a current service object.

The topological graph of service objects includes service objects at a plurality of hierarchical levels. View mode may be understood as the pattern and style for presenting data in the page, such as: a table mode, a board mode, a Gantt chart mode, and a topological mode. In this embodiment, a description is mainly given to a topological mode. The topological mode can be the mode in which data are displayed in the page in the form of topological structure, and the data have a hierarchical relationship. The topological mode can be a tree mode, that is, a tree structure is presented between the data.

Figures 2, 3:
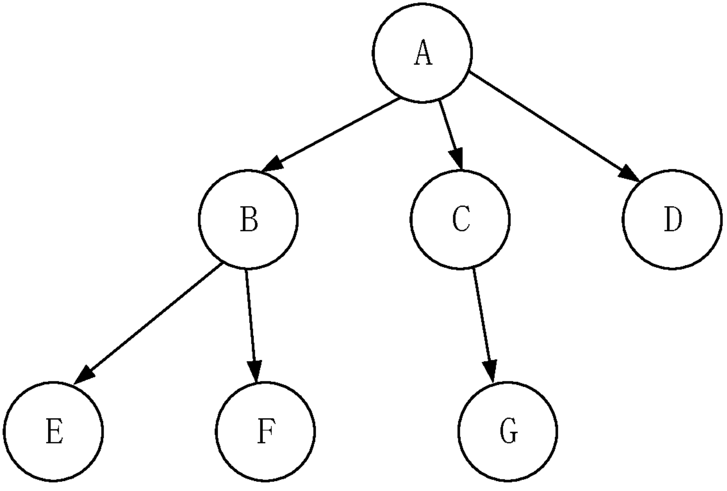
FIG. 2 is a diagram illustrating an example of an interface for switching view modes provided by an embodiment of the present disclosure.
FIG. 3 is a schematic diagram of a topological graph of service objects provided by an embodiment of the present disclosure.

In this embodiment, when the user enters a current data page, the page can display data in a default view mode or a view mode selected last time. An entry for switching the view mode is provided in the current data page, and the user clicks the entry for switching view mode to enter a view setting page. A plurality of view mode selection items are provided in the view setting page, and the user can select a desired view mode among the plurality of view modes, thereby achieving switching between view modes. Exemplarily, FIG. 2 is an exemplary diagram of an interface for switching a view mode in the embodiment, and as shown in FIG. 2, the interface includes: a view name input box, a plurality of view mode selection items. The user can input a customized view name in the view name input box, and a required view mode is selected in a plurality of view modes, for example, a topological pattern is selected.

The topological graph of service objects can be a topological graph formed by service objects and configured by the user in advance, and the topological graph of service objects includes a plurality of different service objects. In this embodiment, the topological graph of service objects can be a tree graph of service objects. Service objects can be understood as data objects that are involved in the service, and can also be referred to as work item types. For example, for a software development service, the included service objects can be: "demand", "version", "plan", and "defect", etc. The current service object can be a service object selected by the user, and the topological graph of service objects corresponding to the service object can be understood as a topological graph containing the current service object. Exemplarily, FIG. 3 is a schematic diagram of a topological graph of service objects in this embodiment, and as shown in FIG. 3, the service objects included in the topological graph include: A, B, C, D, E, F, and G, wherein A is the root node, B, C, and D is the child node of A, E and F are the child nodes of B, and G is the child node of C.

Optionally, before detecting that a user switches a view mode to a topological mode, the page interaction method provided by the embodiments of the present disclosure further includes the following steps: jumping to a configuration page based on a configuration operation triggered by the user; displaying at least one service object selected by the user from the resource panel on the configuration panel based on a first selection operation of the user; receiving the hierarchical information and the incidence relationship between the service objects configured by the user on at least one service object in the configuration panel; and generating the topological graph of service objects based on the hierarchical information and the incidence relation.

The configuration page includes a resource panel and a configuration panel, wherein the resource panel includes a plurality of service objects displayed according to the hierarchical relationship. The plurality of service objects displayed in the resource panel constitute an original topological graph, and the original topological graph is configured by the system in advance. The manner of displaying a plurality of service objects in the resource panel can be: removing the reduplicate and displaying the service objects according to the hierarchical information in the original topological graph from top to bottom. Removing the reduplicate and displaying the service objects can be understood as: when the same service object is on different hierarchical levels in the original topological graph, the service object appears in the resource panel only once, and a user can select the service object for multiple times and set the service object in different hierarchical levels.

Figure 4:
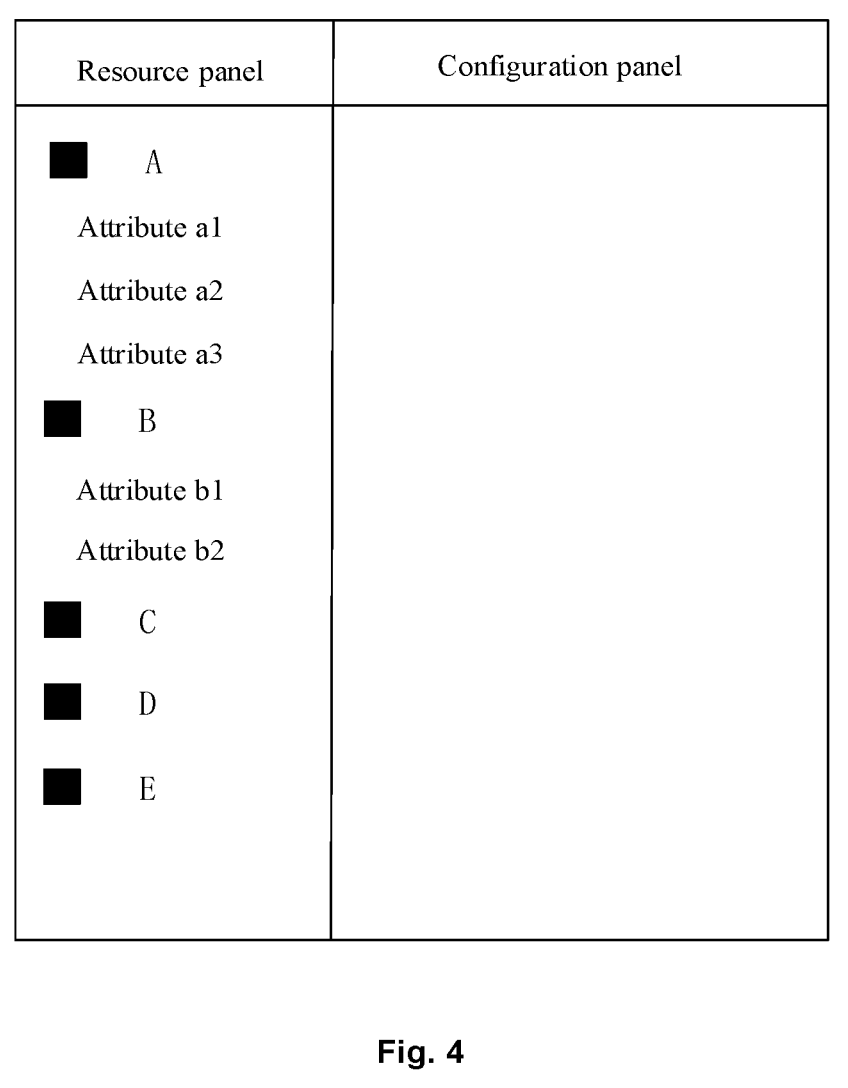

In the resource panel, each service object further includes at least one attribute information, and each attribute information is characterized by different fields. The display order of each attribute information can be: displaying according to a default order; or displaying according to the order of the pinyin initials of the attribute information; or, the attribute information of the service object selected in the history period is preferentially displayed, and other attribute information can be displayed according to the order of the pinyin initials of the attribute information. Exemplarily, FIG. 4 is a schematic diagram of a configuration page in the embodiment, and as shown in FIG. 4, a resource panel is on the left side, and a configuration panel is on the right side. In the resource panel, the service objects A, B, C, D and E are displayed, and the attribute information of each service object can be expanded or retracted. As shown in FIG. 4, attribute information of the service objects A and B is displayed, and attribute information of C, D and E is retracted.

The configuration panel includes three sub-panels, which are respectively: a display information configuration sub-panel, an incidence relationship configuration sub-panel and a hierarchical relationship configuration sub-panel. The user drags the service object selected from the resource panel to the configuration panel for displaying, and respectively configures the display information, the incidence relationship and the hierarchical relationship so as to acquire a topological graph of service objects.

In this embodiment, in the display information configuration sub-panel, the user can configure the attribute information that needs to be displayed for each service object and the display order of the attribute information. Specifically, the displaying at least one service object selected by the user from the resource panel on the configuration panel based on a selection operation of the user includes: for each selected service object, selecting attribute information of at least one service object from the resource panel based on a second selection operation of the user; and ordering the selected attribute information based on the drag operation of the user so as to display the attribute information according to an ordering result.

For each selected service object, the number of the attribute information selected by the user is less than or equal to the number of the attribute information displayed in the resource panel. Exemplarily, FIG. 5 is an exemplary diagram of the configuration page in this embodiment, and as shown in FIG. 5, the display information configuration sub-panel of the configuration panel is on the left side, and in the display information configuration sub-panel, the service objects A, B and C are selected by the user and are at different hierarchical levels, in which service object B is selected twice. The selected attribute information corresponding to Service object A includes an attribute a1 and an attribute a3, wherein the selected attribute information corresponding to one service object B is an attribute b2, the selected attribute information corresponding to the other service object B is an attribute b1, and the selected attribute information corresponding to service object C includes an attribute c1 and an attribute c2. In this embodiment, the user can configure the displayed attribute information, so as to improve the personalized requirements of data display.

In this embodiment, in the hierarchical relationship configuration sub-panel, the service objects selected by the user are displayed in the form of a topological graph. The user can adjust the hierarchical information of the service objects in the displayed topological graph. Specifically, the manner for displaying at least one service object selected by the user from the resource panel on the configuration panel based on the first selection operation of the user can be: for the service object displayed on the configuration panel, if the service object has unselected sub-service objects, an add button arranged on the service object is in a clickable state; when detecting that the user clicks the add button, expanding and displaying the sub-service object; and adding the selected sub-service object to the configuration panel based on a selection operation of the user.

In the hierarchical relationship configuration sub-panel, the service object at the first level is default and cannot be deleted. The service objects at other hierarchical levels are provided with a "delete" button, and the user can delete the service object and all the service objects at all the sub-hierarchical levels thereof from the configuration panel by clicking the "delete" button. The "delete" button can be represented by "X". If the service object in the configuration panel has unselected sub-service objects, the add button provided in the service object can be clicked. If the user clicks the add button, the sub-service objects are expanded and displayed, and then the selected sub-service objects are added into the configuration panel based on the selection operation of the user. The "add" button can be represented by "+".

Figures 6, 7:
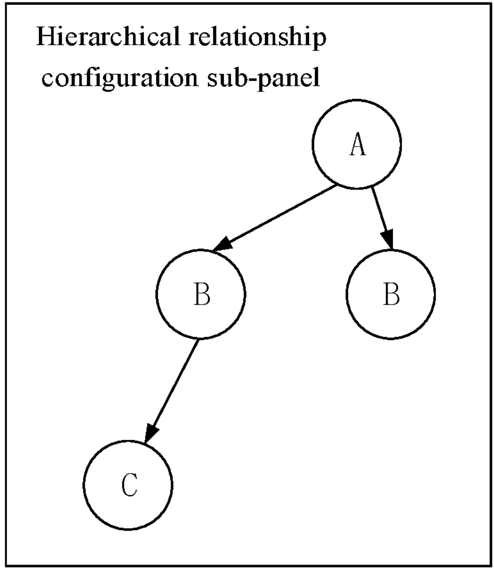
FIG. 6 is an exemplary diagram for configuring hierarchical level provided by an embodiment of the present disclosure.
FIG. 7 is an exemplary diagram for configuring incidence relationship provided by an embodiment of the present disclosure.

All the sub-service objects of the service object can be displayed, and the repeated sub-service objects are subjected to duplicate removal processing. In this embodiment, there may be a plurality of incidence relationships between the service object and the sub-service objects thereof. After the user selects a sub-service object, the first incidence relationship is configured by default, and the user can modify the incidence relationship. Exemplarily, FIG. 6 is an exemplary diagram for configuring hierarchical relationship in the present embodiment, as shown in FIG. 6, the first hierarchical level is A, the second hierarchical level includes two A, and the third hierarchical level is C. In the embodiment, the hierarchical relationship is configured for the service object selected by the user on the hierarchical relationship configuration sub-panel, so that the convenience in configuring the hierarchical relationship is improved.

In the incidence relationship configuration sub-panel, the user can configure the incidence relationship between two service objects, and the two service objects have a parent-child relationship in the topological graph. Two service objects having established the incidence relationship and at least one incidence relationship which can be selected between the two service objects are displayed in the incidence relationship configuration sub-panel, and the user selects one of the at least one incidence relationship. For a certain service object, if the child node of the service object includes two or more same child service objects, different incidence relationships are configured between the service object and the two or more same child service objects. Exemplarily, FIG. 7 is an exemplary diagram for configuring incidence relationship in the present embodiment, and as shown in FIG. 7, in the incidence relationship configuration sub-panel, the incidence relationship between the service objects A and B is configured. For example, taking FIG. 6 as an example, if two child nodes of A are both B, different incidence relationships need to be configured between A and two B.

In this embodiment, a configuration entry for the topological graph of service objects is provided, which may improve convenience in managing data.

S120, extracting, from the topological graph of service objects, a topological subgraph of service objects taking the current service object as highest hierarchical level.

Figure 8:
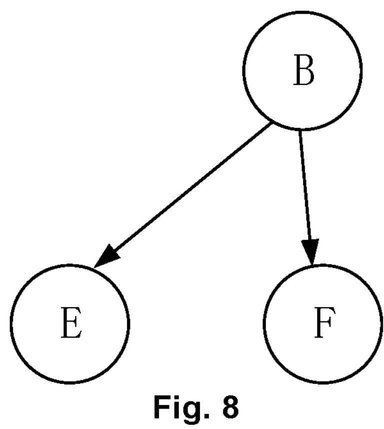
FIG. 8 is a schematic diagram of a topological subgraph of service objects provided by an embodiment of the present disclosure.

The current service object is taken as the highest hierarchical level can be understood as that the current service object is taken as the root node. In this embodiment, if the current service object is located on a plurality of hierarchical levels in the topological graph of the service object, the extraction is started from the highest hierarchical level where the current service object is located. In this embodiment, the topological subgraph of service objects in which the current service node is used as the root node is extracted, and only the instance data corresponding to the topological subgraph of service objects needs to be displayed. The instance data located higher than the hierarchical level of the current service node does not need to be displayed, so that the data processing amount can be reduced, and the computing resources can be saved. For example, for the topological graph of service objects in FIG. 3, if the current service object is B, the extracted topological subgraph of service objects takes B as a root node, and FIG. 8 is a schematic diagram of the topological subgraph of service objects.

S130, acquiring instance data corresponding to one or more service objects in the topological subgraph of service objects.

The instance data includes at least one attribute information. The instance data can be understood as specific data of the service object, the service object can be understood as a variable, the instance data can be understood as a specific value of the variable, and one service object can correspond to a plurality of pieces of instance data. The instance data can be composed of the identification information and at least one attribute information. One or more service objects in the topological subgraph of service objects can be understood as part of or all of the service objects in the topological subgraph of service objects. Specifically, the manner of acquiring the instance data corresponding to each service object can be: calling a data interface according to the identification Information (ID) of one or more service objects, and acquiring the instance data corresponding to one or more service objects through the data interface.

S140, displaying the instance data on the current interface according to the hierarchical relationship of the topological subgraph of service objects.

The process of displaying the instance data on the current interface according to the hierarchical relationship of the topological subgraphs of the service objects can be understood as: displaying the instance data corresponding to the topological subgraph of the service object in the hierarchical graph form.

In this embodiment, the manner of displaying the instance data on the current interface according to the hierarchical relationship of the topological subgraph of service objects can be: displaying the instance data in a list form according to the hierarchical relationship of the topological subgraphs of the service objects. The list form can be understood as: one piece of instance data occupies one row or one column, and each piece of instance data is displayed in the corresponding column or row. In order to match the displayed data with the topological graph, different hierarchical levels correspond to different indentation information, and the indentation information and the hierarchical information are in an inversely proportional relationship, namely, the higher the hierarchical level is, the smaller the indentation information is, and the smaller the hierarchical level is, the larger the indentation information is. In this embodiment, the root node is located at the highest hierarchical level.

Specifically, the manner of showing the instance data on the current interface according to the hierarchical relationship of the topological subgraph of service objects can be: determining the position information of the cells where one or more service objects are located according to the hierarchical relationship of the topological subgraphs of the service objects; and the instance data are displayed within the corresponding cells based on the position information.

The position information includes indentation information, and the cells are row cells or column cells.

Specifically, if the cell is a line cell, the indentation information is a horizontal indentation size, and the line height of the line cell needs to be configured; the process of determining the position information of the cell where one or more service objects are located according to the hierarchical relationship of the topological subgraph of the service object can be: firstly, determining the ordering of the instance data of the node according to the hierarchical relationship, then determining the longitudinal coordinate of the corresponding cells according to the ordering and the line height, then determining the transverse indentation size of the cells according to the hierarchical information, and then determining the transverse coordinate based on the transverse indentation size. The transverse coordinate and the longitudinal coordinate constitute the position information of the cell. After the position information of each cell is acquired, rendering each instance data to the corresponding cell for display.

Specifically, if the cell is a column cell, the indentation information is a longitudinal indentation size, and the column width of the column cell needs to be configured; the process of determining the position information of the cell where one or more service objects are located according to the hierarchical relationship of the topological subgraph of the service object can be: firstly, determining the ordering of the instance data of the node according to the hierarchical relationship, then determining the transverse coordinates of the corresponding cells according to the ordering and the column width, then determining the longitudinal indentation size of the cells according to the hierarchical information, and determining the longitudinal coordinates based on the longitudinal indentation size. The transverse coordinates and the longitudinal coordinates constitute the position information of the cells. After the position information of each cell is acquired, rendering each instance data to the corresponding cell for display. In the embodiment, the instance data are displayed in a list form according to the hierarchical relationship, so that the displayed instance data are matched with the topological structure, and the diversity of data display is improved.

Optionally, the process of displaying the instance data in the corresponding cell based on the position information can be: for each service object, dividing the cell into a plurality of sub-cells according to a number of attribute information contained in the instance data; and sequentially displaying the plurality of attribute information in the corresponding sub-cells.

Figure 9:
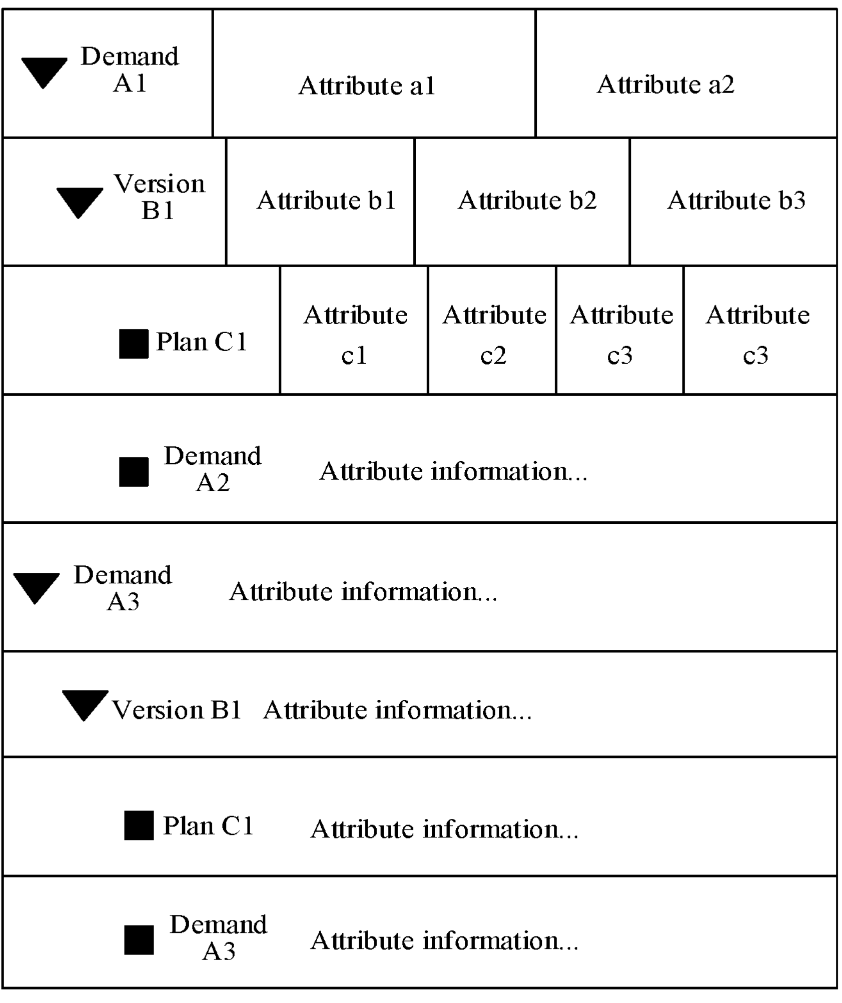
FIG. 9 is an exemplary diagram of an interface displaying instance data provided by an embodiment of the present disclosure.

In this embodiment, the number and the type of the attribute information included in each service object may be different or the same, so that the cells corresponding to each service object do not need to be aligned strictly. The category and display order of the attribute information of each instance data are previously set by the user according to the solutions of the above embodiment. For example, for a "demand service object" in a software development service, the attribute information can include: name, priority, person in charge, demand status, creation time, creator, etc. Because the identification information occupies one sub-cell, the cells need to be divided into sub-cells with the number of attribute information+1, and finally the identification information is displayed in the first sub-cell, and the attribute information is displayed in the corresponding sub-cells according to a preset order. For example, FIG. 9 is an exemplary diagram showing instance data on an interface in the present embodiment. As shown in FIG. 9, the instance data are indented differently according to different hierarchical levels, so that the displayed instance data has a hierarchical relationship. As shown in FIG. 9, different service objects contain different attribute information, so the corresponding sub-cells (columns) of each instance data do not need to be aligned strictly. In this embodiment, the plurality of attribute information are sequentially displayed in the corresponding sub-cells, and the instance data can be accurately displayed in the corresponding position in the interface.

Optionally, after displaying the instance data on the current interface according to the hierarchical relationship of the topological subgraph of service objects, the method further includes the following steps: if the service object corresponding to the instance data has a sub-service object; providing an expansion or retraction button in a cell corresponding to the instance data; and when a clicking operation of the user on the expansion or retraction button is detected, the instance data of the sub-service object is retracted or expanded.

Figures 10, 11:
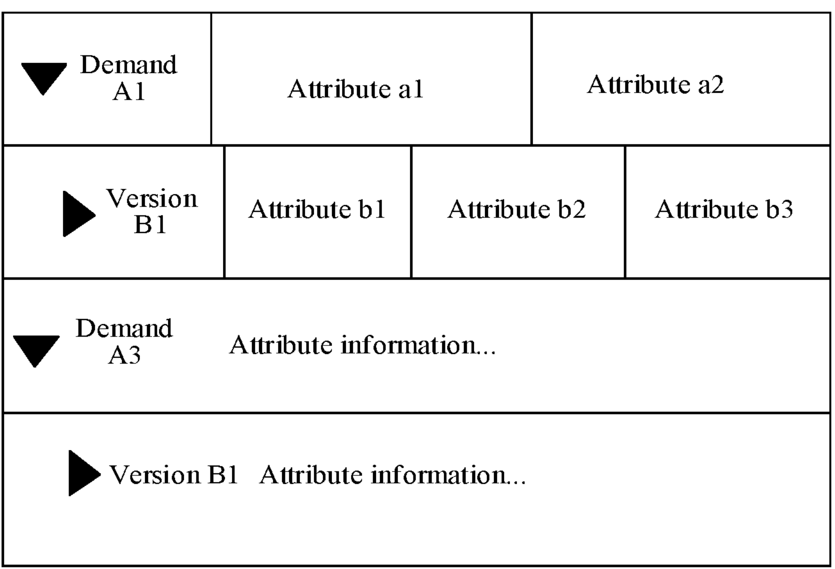
FIG. 10 is a schematic diagram for retracting sub-service objects provided by an embodiment of the present disclosure.
FIG. 11 is a schematic view of a filter panel provided by an embodiment of the present disclosure.

In this embodiment, for a service object having sub-service objects, an expansion or retraction operation can be performed on the sub-service objects, so that the user can expand the instance data level by level, thereby viewing the instance data of each hierarchical level through the levels according to the structure of the topological graph, and simultaneously the instance data of the sub-service object can be retracted so as to save display space. For example, as shown in FIG. 9, for demand A1, the sub-service object thereof is version B1, an expansion or retraction button may be provided on demand A1, and a user can expand and display or retract version B1 by clicking the expansion or retraction button. Similarly, the same principle applies to the version B1 and the demand A3. Exemplary FIG. 10 is a schematic diagram of retracting sub-service objects, and as shown in FIG. 10, in order to retract the sub-service objects of version B1, plan C1 and demand A2 are hidden and plan C1 and demand A3 are hidden in the current interface. In the embodiment, by providing the expansion or retraction button, the user can conveniently carry out hierarchical level expansion and retraction on the instance data, and the convenience in managing data is improved.

Optionally, after the instance data are displayed on the current interface according to the hierarchical relationship of the topological subgraph of service objects, the method further includes the following steps: detecting an adjustment operation of the user on the target cell, and synchronously adjusting the height and/or the width of the cell of the service object at the same hierarchical level based on the adjustment operation.

The service object at the same hierarchical level is the service object at the same hierarchical level with the service object of the target cells. In the present application scenario, the size of the cells can be modified, including width and/or height adjustment. In this embodiment, when the adjustment operation of the user on the target cell is detected, the cells at the same hierarchical level as the target cell are synchronously adjusted. For example, for FIG. 9, assuming that the adjustment of user on the height of the cell in which the demand A1 is located is detected, since the demand A3 and the demand A1 are both at the first hierarchical level, the height of the cell in which the demand A3 is located is adjusted synchronously. In this embodiment, the height and/or width of the cells of the service objects at the same hierarchical level are synchronously adjusted based on the adjustment operation, so that the editing efficiency can be improved.

Optionally, the data page of this embodiment further provides a data statistics window, and the total number of the service objects and the data processing progress of the current page are recorded in the data statistics window. The data processing progress can be understood as the proportion of the service objects which are already filed to the total work items.

Optionally, after the instance data are displayed on the current interface according to the hierarchical relationship of the topological subgraph of service objects, the method further includes the following steps: performing a query operation on the instance data based on a query criterion input by a user; and displaying the instance data that meet the query criterion.

The query criterion includes at least one of: a filter criterion, an ordering criterion, and a grouping criterion. Each service object has its corresponding query criterion, which is preset by the system and can be selected by the user.

In this embodiment, the user can select the filtering criterion in the filter panel. Exemplarily, FIG. 11 is a schematic diagram of the filter panel in this embodiment, and as shown in FIG. 11, the left area displays each service object (for example, including "demand", "plan", and "defect") according to a hierarchical relationship of the topological graph, and the right area displays the filter criterion corresponding to the service object. If the user selects "demand" in the left area, the filter criterion corresponding to the "demand" are displayed in the right area, and the user can select the required filter criterion from the displayed filter criteria. The filter criteria of each hierarchical level of service objects are constituted by the filter criterion of the high hierarchical level plus the filter criterion of the current hierarchical level. As shown in FIG. 11, the final filter criteria for "defect" include the filter criterion for "demand"+the filter criterion for "defect".

Specifically, after the filter criterion is set for each service object, the instance data of each service object is filtered according to the filter criterion, the filtered instance data are displayed, and the instance data which does not meet the filter criterion are hidden.

Optionally, the manner of displaying the instance data that meet the query criterion can be: when the query criterion is the filter criterion, hiding the instance data of the service object of which all the sub-service objects do not meet the filter criterion.

In this embodiment, when the user selects the option of "hiding parent data", if all the sub-service objects of a certain service object do not meet the filter criterion, the instance data of the service object is directly hidden. For example, with respect to FIG. 9, when the instance data are filtered according to the filter criterion set by the user, if the child node version B1 of the demand A1 does not meet the filter criterion, the instance data of the demand A1 is hidden, that is, only the instance data of the demand A3 and the child node thereof are displayed on the current interface. In this embodiment, the service objects whose sub-service objects do not meet the filter criterion are hidden, so that the reliability of filter can be ensured.

Figure 12:
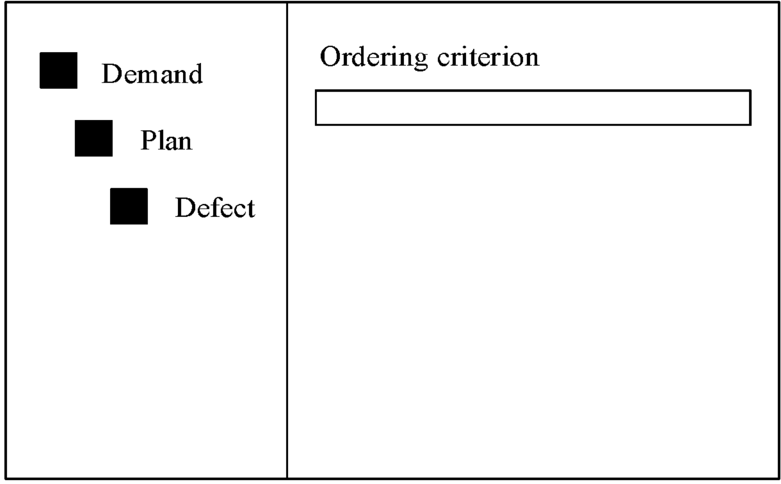
FIG. 12 is a schematic view of an ordering panel provided by embodiments of the present disclosure.

In this embodiment, the user can select an ordering criterion in the ordering panel. Exemplarily, FIG. 12 is a schematic diagram of the ordering panel in this embodiment, and as shown in FIG. 12, the left area displays the service objects (for example, including "demand", "plan", and "defect") according to the hierarchical relationship of the topological graph, and the right area displays the ordering criterion corresponding to the service objects. Assuming that the user selects "demand" in the left area, the ordering criteria corresponding to the "demand" is displayed in the right area, and the user can select the required ordering criterion from the displayed ordering criteria. In this embodiment, the ordering can be ordering of multiple instance data corresponding to a certain service object, for example: ordered in the order of the initials.

Figure 13:
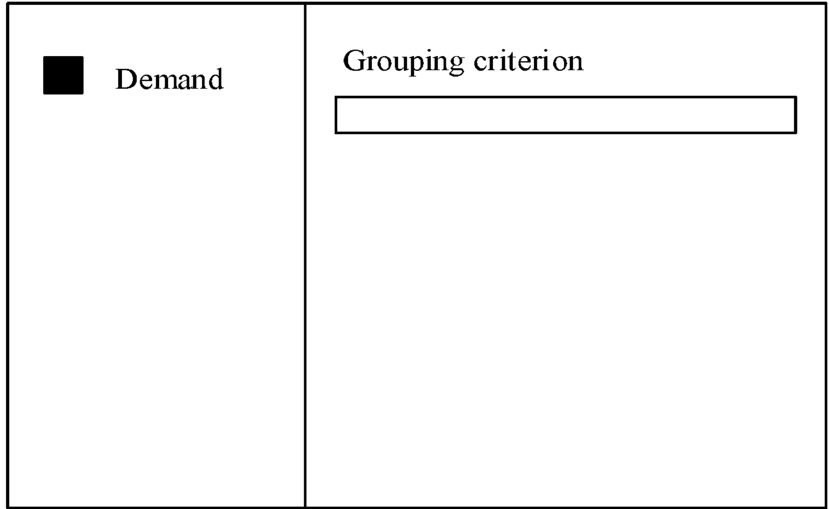
FIG. 13 is a schematic diagram of a grouping panel provided by an embodiment of the disclosure

In this embodiment, the user can select the grouping criterion in the grouping panel. In this embodiment, grouping is to group multiple instance data of the same service object, and as a result of grouping, the hierarchical structure is divided into multiple groups while the hierarchical structure is maintained. For example: under the hierarchical structure of version-iteration-demand-defect, when grouping is performed on "iteration", the structural body of iteration-demand-defect enters each group, and the same grouping item may appear under the instance data of different versions. Exemplarily, FIG. 13 is a schematic diagram of a grouping panel in this embodiment, and as shown in FIG. 13, a left area is the service object to be grouped, and a right side displays a grouping criterion corresponding to the service object. In this embodiment, only one service object on the left side can be selected at a time to set the grouping criterion, and the original grouping criterion is lost after the service object is switched.

In this embodiment, the user can query the data by setting the query criterion, so that convenience in data query can be improved.

According to the technical solutions of the embodiment of the disclosure, when detecting that a user switches a view mode to a topological mode, a topological graph of service objects corresponding to a current service object is acquired; wherein the topological graph of service objects includes service objects at a plurality of hierarchical levels; a topological subgraph of service objects taking the current service object as highest hierarchical level is extracted from the topological graph of service objects; instance data corresponding to one or more service objects in the topological subgraph of service objects are acquired; and the instance data are displayed on a current interface according to a hierarchical relationship of the topological subgraph of service objects. According to the page interaction method provided by the embodiment of the disclosure, when a user switches the view mode to the topological mode, the instance data of the topological subgraph of service objects corresponding to the current service object are displayed on the current interface, so that the user manages the service data in an interactive manner, and the convenience in managing the service data is improved.

Figure 14:
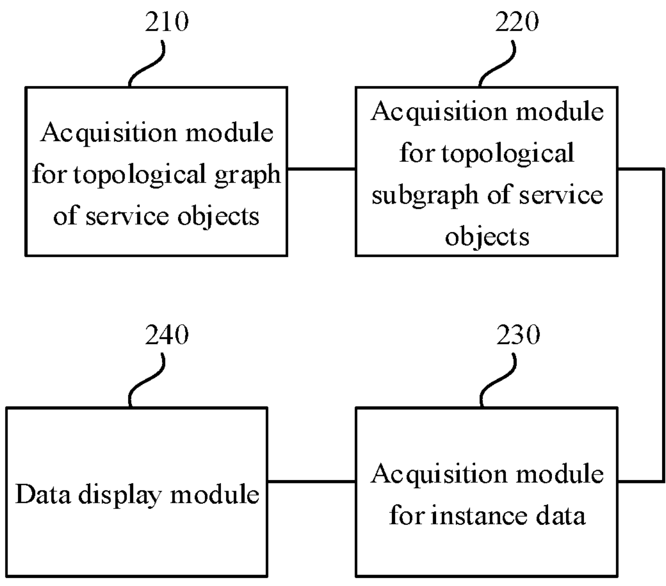
FIG. 14 is a schematic diagram of the structure of a page interaction device provided by an embodiment of the present disclosure.

FIG. 14 is a schematic diagram of the structure of a page interaction device provided by an embodiment of the present disclosure, and as shown in FIG. 14, the device includes:

- an acquisition module 210 for topological graph of service objects, configure to when detecting that a user switches a view mode to a topological mode, acquire a topological graph of service objects corresponding to a current service object; wherein the topological graph of service objects includes service objects at a plurality of hierarchical levels;
- an acquisition module 220 for topological subgraph of service objects, configured to extract, from the topological graph of service objects, a topological subgraph of service objects taking the current service object as highest hierarchical level;
- an acquisition module 230 for instance data, configured to acquire instance data corresponding to one or more service objects in the topological subgraph of service objects; and
- a data display module 240, configured to display the instance data on a current interface according to a hierarchical relationship of the topological subgraph of service objects.

Optionally, the data display module 240 is further configured to:

- determine position information of cells where the one or more service objects are located according to the hierarchical relationship of the topological subgraph of service objects; wherein, the position information includes indentation information; and display the instance data within corresponding cells based on the position information; wherein the cells are row cells or column cells.

Optionally, the data display module 240 is further configured to:

for each service object, dividing the cell into a plurality of sub-cells according to a number of a plurality of attribute information contained in the instance data; and sequentially displaying the plurality of attribute information within corresponding sub-cells.

Optionally, the page interaction device further includes a first interaction module, configured to:

if the service object corresponding to the instance data has a sub-service object, providing an expansion or retraction button in a cell corresponding to the instance data; and when a clicking operation of the user on the expansion or retraction button is detected, the instance data of the sub-service object is retracted or expanded.

Optionally, the page interaction device further includes a second interaction module, configured to:

detect an adjustment operation of the user on a target cell, and synchronously adjusting a height and/or width of the cell of the service object at the same hierarchical level based on the adjustment operation; and the service object at the same hierarchical level is the service object at the same hierarchical level with the service object of the target cell.

Optionally, the page interaction device further includes a configuration module, configured to:

jump to a configuration page based on a configuration operation triggered by the user; wherein the configuration page includes a resource panel and a configuration panel, and the resource panel includes a plurality of service objects displayed according to the hierarchical relationship;

display at least one service object selected by the user from the resource panel on the configuration panel based on a first selection operation of the user;

receive the hierarchical information and an incidence relationship between the service objects configured by the user on the at least one service object in the configuration panel; and generate the topological graph of service objects based on the hierarchical information and the incidence relation.

Optionally, the configuration module is further configured to:

for the service object displayed on the configuration panel, if the service object has unselected sub-service objects, an add button arranged on the service object is in a clickable state;

when detecting that the user clicks the add button, expand and display the sub-service objects; and add the selected sub-service objects to the configuration panel based on a selection operation of the user.

Optionally, the resource panel further displays attribute information contained in one or more service objects; and a configuration module, configured to:

for each selected service object, select attribute information of at least one service object from the resource panel based on a second selection operation of the user; and order the selected attribute information based on a dragging operation of the user so as to display the attribute information according to an ordering result.

Optionally, the page interaction device further includes a query module, configured to:

perform a query operation on the instance data based on a query criterion input by a user; wherein the query criterion includes at least one of: a filter criterion, an ordering criterion and a grouping criterion; and display the instance data that meet the query criterion.

Optionally, the query module is further configured to:

when the query criterion is the filter criterion, hiding the instance data of the service object of which the sub-service objects do not meet the filter criterion.

The page interaction device provided by the embodiment of the disclosure can execute the page interaction method provided by any embodiment of the disclosure, and has corresponding functional modules and beneficial effects of the execution method.

It should be noted that, the units and modules included in the device are merely divided according to functional logic, but are not limited to the above division as long as the corresponding functions can be implemented. In addition, specific names of the functional units are also only used for distinguishing one functional unit from another, and are not used for limiting the protection scope of the embodiments of the present disclosure.

Figure 15:
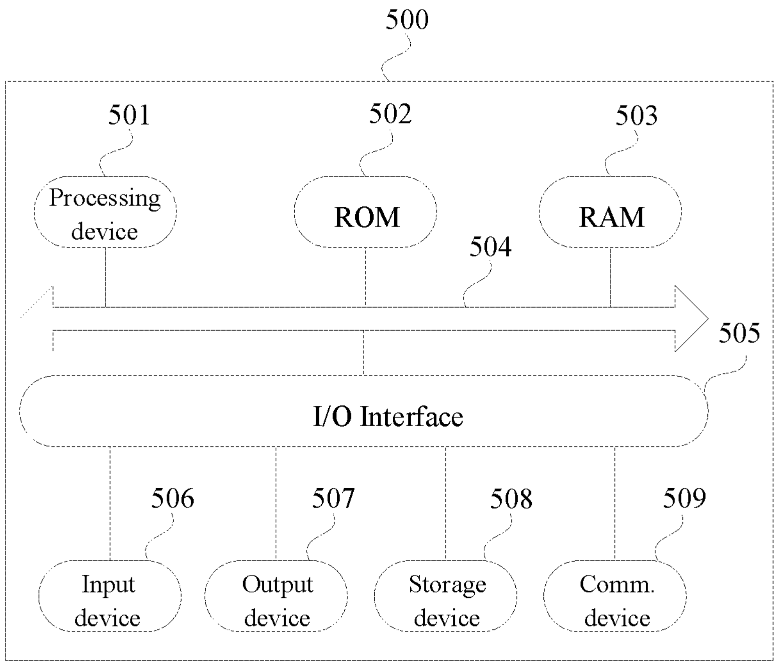
FIG. 15 is a schematic diagram of the structure of an electronic apparatus according to an embodiment of the present disclosure.

FIG. 15 is a schematic structural diagram of an electronic apparatus according to an embodiment of the present disclosure. Referring now to FIG. 15, a schematic diagram of an electronic apparatus (e.g., the terminal apparatus or the server in FIG. 15) 500 suitable for implementing embodiments of the present disclosure is shown. The terminal device in the embodiments of the present disclosure can include, but is not limited to, a mobile terminal such as a mobile phone, a notebook computer, a digital broadcast receiver, a PDA (personal digital assistant), a PAD (tablet computer), a PMP (portable multimedia player), a vehicle terminal (e.g., a car navigation terminal), and the like, and a fixed terminal such as a digital TV, a desktop computer, and the like. The electronic apparatus shown in FIG. 15 is only an example, and should not bring any limitation to the functions and the scope of use of the embodiments of the present disclosure.

As shown in FIG. 15, electronic apparatus 500 can include a processing device (e.g., central processing unit, graphics processor, etc.) 501 that can perform various appropriate actions and processes in accordance with a program stored in a read-only memory (ROM) 502 or a program loaded from a storage device 508 into a random access memory (RAM) 503. In the RAM 503, various programs and data necessary for the operation of the electronic apparatus 500 are also stored. The processing device 501, the ROM 502, and the RAM 503 are connected to each other through a bus 504. An input/output (I/O) interface 505 is also connected to bus 504.

Generally, the following devices can be connected to the I/O interface 505: input device 506 including, for example, a touch screen, a touch pad, a keyboard, mouse, a camera, a microphone, accelerometer, gyroscope and the like; an output device 507 including, for example, a Liquid Crystal Display (LCD), a speaker, a vibrator, and the like; storage device 508 including, for example, magnetic tape, hard disk and the like; and a communication device (Comm. device) 509. The communication device 509 can allow the electronic apparatus 500 to communicate with other devices, either wirelessly or by wire, to exchange data. While FIG. 15 illustrates an electronic apparatus 500 having various means, it is to be understood that not all illustrated means are required to be implemented or provided. More or fewer devices can be alternatively implemented or provided.

In particular, the processes described above with reference to the flow diagrams can be implemented as computer software programs, according to embodiments of the present disclosure. For example, embodiments of the present disclosure include a computer program product including a computer program carried on a non-transitory computer readable medium, the computer program containing program code for performing the method illustrated by the flow chart. In such an embodiment, the computer program can be downloaded and installed from a network via the communication device 509, or installed from the storage device 508, or installed from the ROM 502. The computer program, when executed by the processing device 501, performs the above-described functions defined in the methods of the embodiments of the present disclosure.

The names of messages or information exchanged between devices in the embodiments of the present disclosure are for illustrative purposes only, and are not intended to limit the scope of the messages or information.

The electronic apparatus provided by the embodiment of the present disclosure and the page interaction method provided by the above embodiment belong to the same inventive concept, and technical details that are not described in detail in the embodiment can be referred to the above embodiment, and the embodiment and the above embodiment have the same advantageous effects.

The disclosed embodiments provide a computer storage medium on which a computer program is stored, which when executed by a processor performs the page interaction method provided by the above embodiments.

It should be noted that the computer readable medium of the present disclosure can be a computer readable signal medium or a computer readable storage medium or any combination of the two. A computer readable storage medium can be, for example, but not limited to, an electronic, magnetic, optical, electromagnetic, infrared, or semiconductor system, apparatus, or device, or any combination of the foregoing. More specific examples of the computer readable storage medium can include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, a computer readable storage medium can be any tangible medium that can contain, or store a program for use by or in connection with an instruction execution system, apparatus, or device. In contrast, in the present disclosure, a computer readable signal medium can include a propagated data signal with computer readable program code embodied therein, for example, in baseband or as part of a carrier wave. Such a propagated data signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device. Program code embodied on a computer readable medium can be transmitted using any appropriate medium, including but not limited to: electrical wires, optical cables, radio frequency (RF) and so forth, or any suitable combination of the foregoing.

In some embodiments, the clients and the servers can communicate using any currently known or future developed network Protocol, such as HyperText Transfer Protocol (HTTP), and can be interconnected with any form or medium of digital data communication (e.g., a communication network). Examples of communication networks include a local area network ("LAN"), a wide area network ("WAN"), the Internet, and peer-to-peer networks (e.g., ad hoc peer-to-peer networks), as well as any currently known or future developed network.

The computer readable medium can be embodied in the electronic apparatus or can be separate and not incorporated into the electronic apparatus.

The computer readable medium carries one or more programs which, when executed by the electronic apparatus, cause the electronic apparatus to: when detecting that a user switches a view mode to a topological mode, acquire a topological graph of service objects corresponding to a current service object; wherein the topological graph of service objects includes service objects at a plurality of hierarchical levels; extract, from the topological graph of service objects, a topological subgraph of service objects taking the current service object as highest hierarchical level; acquire instance data corresponding to one or more service objects in the topological subgraph of service objects; and display the instance data on a current interface according to a hierarchical relationship of the topological subgraph of service objects.

Computer program code for carrying out operations for aspects of the present disclosure can be written in any combination of one or more programming languages, including but not limited to an object oriented programming language such as Java, Smalltalk, C++, including conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a Local Area Network (LAN) or a Wide Area Network (WAN), or the connection can be made to an external computer (for example, through the Internet using an Internet service provider).

The flowchart and block diagrams in the figures illustrate the architecture, functionality, and operation of possible implementations of systems, methods and computer program products according to various embodiments of the present disclosure. In this regard, each block in the flowchart or block diagrams can represent a module, a segment of program, or a portion of code, which includes one or more executable instructions for implementing the specified logical function. It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units described in the embodiments of the present disclosure can be implemented by software or hardware. The name of a unit does not in some cases constitute a limitation of the unit itself.

The functions described herein above can be performed, at least in part, by one or more hardware logic components. For example, without limitation, exemplary types of hardware logic components that can be used include: field Programmable Gate Arrays (FPGA), Application Specific Integrated Circuits (ASIC), Application Specific Standard Products (ASSP), system on a chip (SOC), Complex Programmable Logic Devices (CPLD), and the like.

In the context of this disclosure, a machine-readable medium can be a tangible medium that can contain, or store a program for use by or in connection with an instruction execution system, apparatus, or device. The machine-readable medium can be a machine-readable signal medium or a machine-readable storage medium. A machine-readable medium can include, but is not limited to, an electronic, magnetic, optical, electromagnetic, infrared, or semiconductor system, apparatus, or device, or any suitable combination of the foregoing. More specific examples of a machine-readable storage medium would include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The foregoing description is only exemplary of the preferred embodiments of the disclosure and is illustrative of the principles of the technology employed. It will be understood by those skilled in the art that the scope of the disclosure herein is not limited to the particular combination of features described above, but also encompasses other combinations of features described above or equivalents thereof without departing from the spirit of the disclosure. For example, the above features and the technical features disclosed in the present disclosure (but not limited to) having similar functions are replaced with each other to form the technical solution.

Further, while operations are depicted in a particular order, this should not be understood as requiring that such operations be performed in the particular order shown or in sequential order. Under certain circumstances, multitasking and parallel processing may be advantageous. Likewise, while several specific implementation details are included in the above discussion, these should not be construed as limitations on the scope of the disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A page interaction method comprising:

when detecting that a user switches a view mode to a topological mode, acquiring a topological graph of service objects corresponding to a current service object; wherein the topological graph of service objects comprises service objects at a plurality of hierarchical levels, the service objects comprise at least one of demand version plan and defect of management of a service project;

extracting, from the topological graph of service objects, a topological subgraph of service objects taking the current service object as highest hierarchical level;

acquiring instance data corresponding to one or more service objects in the topological subgraph of service objects, the instance data being composed of identification information and at least one attribute information; and displaying the instance data on a current interface according to a hierarchical relationship of the topological subgraph of service objects, wherein the acquiring instance data corresponding to one or more service objects in the topological subgraph of service objects comprises:

calling a data interface according to the identification information of one or more service objects, and acquiring the instance data corresponding to one or more service objects through the data interface.

2. The method of claim 1, wherein the displaying the instance data on a current interface according to a hierarchical relationship of the topological subgraph of service objects comprises:

determining position information of cells where the one or more service objects are located according to the hierarchical relationship of the topological subgraph of service objects; wherein the position information comprises indentation information; and displaying the instance data within corresponding cells based on the position information; wherein the cells are row cells or column cells.

3. The method of claim 2, wherein the displaying the instance data within corresponding cells based on the position information comprises:

for each service object, dividing the cell into a plurality of sub-cells according to a number of a plurality of attribute information contained in the instance data; and sequentially displaying the plurality of attribute information within corresponding sub-cells.

4. The method of claim 2, wherein after the displaying the instance data on a current interface according to a hierarchical relationship of the topological subgraph of service objects, the method further comprises:

if the service object corresponding to the instance data has a sub-service object, providing an expansion or retraction button in a cell corresponding to the instance data; and when a clicking operation of the user on the expansion or retraction button is detected, the instance data of the sub-service object is retracted or expanded.

5. The method of claim 2, wherein after the displaying the instance data on a current interface according to a hierarchical relationship of the topological subgraph of service objects, the method further comprises:

detecting an adjustment operation of the user on a target cell, and synchronously adjusting a height and/or width of the cell of the service object at the same hierarchical level based on the adjustment operation; and the service object at the same hierarchical level is the service object at the same hierarchical level with the service object of the target cell.

6. The method of claim 1, wherein before detecting that a user switches a view mode to a topological mode, the method further comprises:

jumping to a configuration page based on a configuration operation triggered by the user; wherein the configuration page comprises a resource panel and a configuration panel, and the resource panel comprises a plurality of service objects displayed according to the hierarchical relationship;

displaying at least one service object selected by the user from the resource panel on the configuration panel based on a first selection operation of the user;

receiving the hierarchical information and an incidence relationship between the service objects configured by the user on the at least one service object in the configuration panel; and generating the topological graph of service objects based on the hierarchical information and the incidence relation.

7. The method of claim 6, wherein the displaying at least one service object selected by the user from the resource panel on the configuration panel based on a first selection operation of the user comprises:

for the service object displayed on the configuration panel, if the service object has unselected sub-service objects, an add button arranged on the service object is in a clickable state;

when detecting that the user clicks the add button, expanding and displaying the sub-service objects; and adding the selected sub-service objects to the configuration panel based on a selection operation of the user.

8. The method of claim 6, wherein the resource panel further displays attribute information contained in one or more service objects; the displaying at least one service object selected by the user from the resource panel on the configuration panel based on a first selection operation of the user comprises:

for each selected service object, selecting attribute information of at least one service object from the resource panel based on a second selection operation of the user; and ordering the selected attribute information based on a dragging operation of the user so as to display the attribute information according to an ordering result.

9. The method of claim 1, wherein after the displaying the instance data on a current interface according to a hierarchical relationship of the topological subgraph of service objects, the method further comprises:

performing a query operation on the instance data based on a query criterion input by a user; wherein the query criterion comprises at least one of: a filter criterion, an ordering criterion, and a grouping criterion; and displaying the instance data that meet the query criterion.

10. The method of claim 9, wherein the displaying the instance data that meet the query criterion comprises:

when the query criterion is the filter criterion, hiding the instance data of the service object of which all the sub-service objects do not meet the filter criterion.

11. An electronic apparatus, comprising:

one or more processors;

a storage device to store one or more programs, and the one or more programs, when executed by the one or more processors, cause the one or more processors to when detecting that a user switches a view mode to a topological mode, acquire a topological graph of service objects corresponding to a current service object; wherein the topological graph of service objects comprises service objects at a plurality of hierarchical levels, the service objects comprise at least one of demand, version plan, and defect of management of a service project;

extract, from the topological graph of service objects, a topological subgraph of service objects taking the current service object as highest hierarchical level;

acquire instance data corresponding to one or more service objects in the topological subgraph of service objects, the instance data being composed of identification information and at least one attribute information; and display the instance data on a current interface according to a hierarchical relationship of the topological subgraph of service objects, wherein the acquiring instance data corresponding to one or more service objects in the topological subgraph of service objects comprises:

calling a data interface according to the identification Information of one or more service objects, and acquiring the instance data corresponding to one or more service objects through the data interface.

12. The electronic apparatus of claim 11, wherein the one or more programs, when executed by the one or more processors, further cause the one or more processors to:

determine position information of cells where the one or more service objects are located according to the hierarchical relationship of the topological subgraph of service objects; wherein the position information comprises indentation information; and display the instance data within corresponding cells based on the position information; wherein the cells are row cells or column cells.

13. The electronic apparatus of claim 12, wherein the one or more programs, when executed by the one or more processors, further cause the one or more processors to:

for each service object, divide the cell into a plurality of sub-cells according to a number of a plurality of attribute information contained in the instance data; and sequentially display the plurality of attribute information within corresponding sub-cells.

14. The electronic apparatus of claim 12, wherein the one or more programs, when executed by the one or more processors, further cause the one or more processors to:

if the service object corresponding to the instance data has a sub-service object, provide an expansion or retraction button in a cell corresponding to the instance data; and when a clicking operation of the user on the expansion or retraction button is detected, the instance data of the sub-service object is retracted or expanded.

15. The electronic apparatus of claim 12, wherein the one or more programs, when executed by the one or more processors, further cause the one or more processors to:

detect an adjustment operation of the user on a target cell, and synchronously adjust a height and/or width of the cell of the service object at the same hierarchical level based on the adjustment operation; and the service object at the same hierarchical level is the service object at the same hierarchical level with the service object of the target cell.

16. A non-transitory computer-readable storage medium containing computer-executable instructions, wherein computer-executable instructions, when executed by a computer processor, cause the computer processor to when detecting that a user switches a view mode to a topological mode, acquire a topological graph of service objects corresponding to a current service object;

wherein the topological graph of service objects comprises service objects at a plurality of hierarchical levels, the service objects comprise at least one of demand, version, plan, and defect of management of a service project;

extract, from the topological graph of service objects, a topological subgraph of service objects taking the current service object as highest hierarchical level;

acquire instance data corresponding to one or more service objects in the topological subgraph of service objects, the instance data being composed of identification information and at least one attribute information; and display the instance data on a current interface according to a hierarchical relationship of the topological subgraph of service objects, wherein the acquiring instance data corresponding to one or more service objects in the topological subgraph of service objects comprise:

calling a data interface according to the identification Information of one or more service objects, and acquiring the instance data corresponding to one or more service objects through the data interface.

17. The storage medium of claim 16, wherein the computer-executable instructions, when executed by a computer processor, further cause the computer processor to:

determine position information of cells where the one or more service objects are located according to the hierarchical relationship of the topological subgraph of service objects; wherein the position information comprises indentation information; and display the instance data within corresponding cells based on the position information; wherein the cells are row cells or column cells.

18. The storage medium of claim 17, wherein the computer-executable instructions, when executed by a computer processor, further cause the computer processor to:

for each service object, divide the cell into a plurality of sub-cells according to a number of a plurality of attribute information contained in the instance data; and sequentially display the plurality of attribute information within corresponding sub-cells.

19. The storage medium of claim 17, wherein the computer-executable instructions, when executed by a computer processor, further cause the computer processor to:

if the service object corresponding to the instance data has a sub-service object, provide an expansion or retraction button in a cell corresponding to the instance data; and when a clicking operation of the user on the expansion or retraction button is detected, the instance data of the sub-service object is retracted or expanded.

20. The storage medium of claim 17, wherein the computer-executable instructions, when executed by a computer processor, further cause the computer processor to:

detect an adjustment operation of the user on a target cell, and synchronously adjust a height and/or width of the cell of the service object at the same hierarchical level based on the adjustment operation; and the service object at the same hierarchical level is the service object at the same hierarchical level with the service object of the target cell.

* * * * *